United States Patent [19]

Givens

[11] 4,066,892
[45] Jan. 3, 1978

[54] COAL LOGGING SYSTEM

[75] Inventor: Wyatt W. Givens, Dallas, Tex.

[73] Assignee: Mobil Oil Corporation, New York, N.Y.

[21] Appl. No.: 714,441

[22] Filed: Aug. 16, 1976

[51] Int. Cl.² .............................................. G01V 5/00
[52] U.S. Cl. .................................... 250/270; 250/253; 250/262
[58] Field of Search .............. 250/270, 262, 264, 265, 250/253

[56] References Cited

U.S. PATENT DOCUMENTS

| 3,115,579 | 12/1963 | Hall et al. | 250/270 |
|---|---|---|---|
| 3,509,343 | 4/1970 | Locke | 250/265 |
| 3,654,467 | 4/1972 | Tittman et al. | 250/265 |
| 3,849,646 | 11/1974 | McKinlay et al. | 250/270 |

*Primary Examiner*—Harold A. Dixon
*Attorney, Agent, or Firm*—C. A. Huggett; George W. Hager, Jr.

[57] ABSTRACT

A borehole logging tool employs two neutron sources of differing energy outputs, two gamma-ray detectors, and a neutron detector in the radioactivity logging of a coal-bearing formation. A first of the gamma-ray detectors measures the gamma rays produced by the formation in response to the higher energy neutron source. A second of the gamma-ray detectors measures the gamma rays produced by the formation in response to the lower energy neutron source. The neutron detector measures thermal or epithermal neutrons produced by the formation in response to the neutron sources. These measurements are selectively transferred to a recording system employing a plurality of energy level discriminators, count rate meters, and comparators. The recording system, in response to these measurements, provides output signals representative of the carbon, sulfur, ash, and neutron moderating power of the coal in the formation being logged. The carbon and neutron moderating power provide a means of measuring the energy content of coal.

15 Claims, 1 Drawing Figure

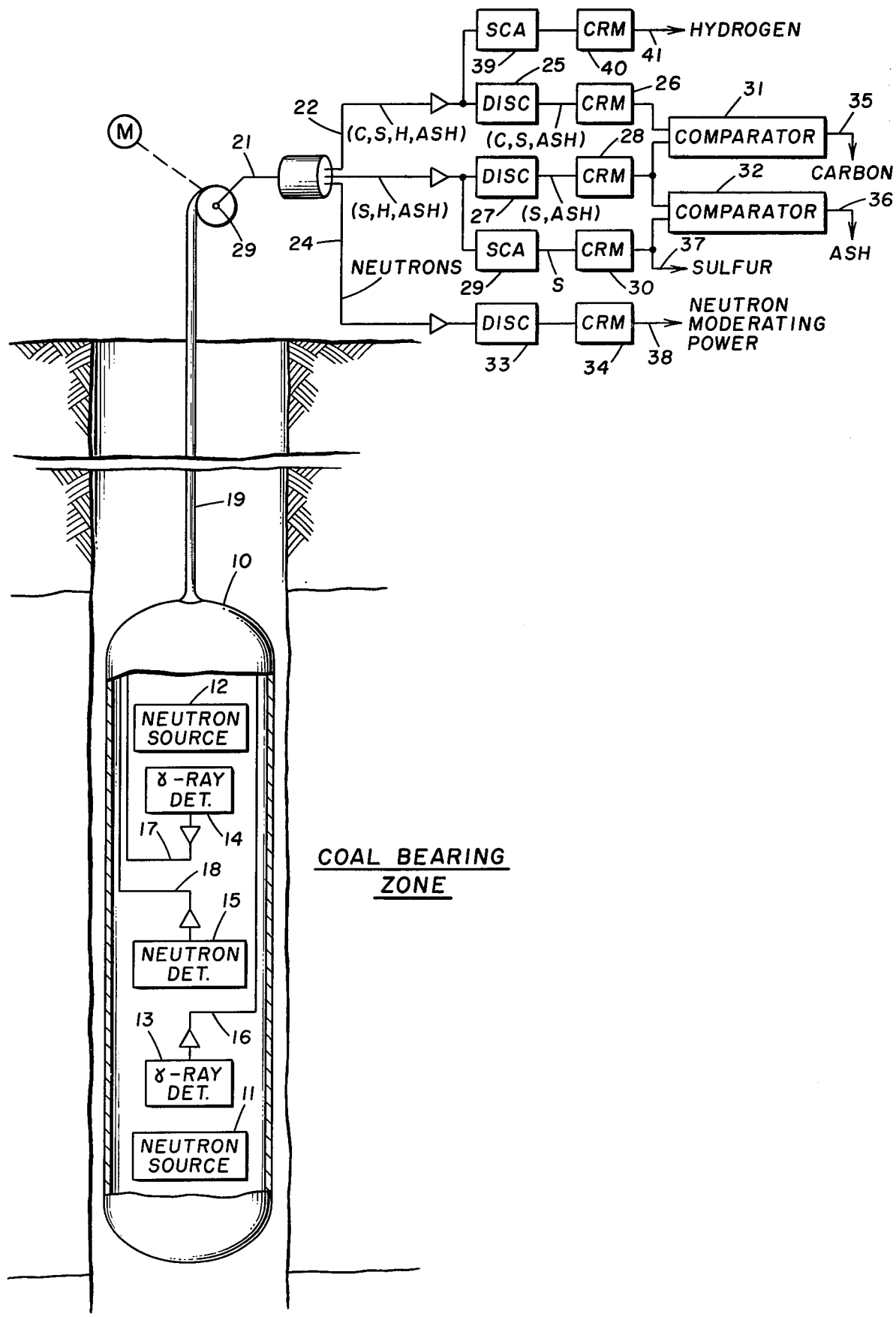

COAL LOGGING SYSTEM

BACKGROUND OF THE INVENTION

This invention relates to radioactivity well logging and more particularly to a method and system for locating a coal-bearing zone in the earth and identifying its quality based primarily upon BTU and ash contents.

The coal mining industry has primarily used coring and core assaying in locating coal-bearing zones, in defining the thickness of such zones, and in determining coal quality from BTU and ash contents. Coal consists primarily of carbon, hydrogen, ash, and sulfur. The density or specific gravity of coal is strongly related to its ash content. Ash represents that portion of coal that is left over after combustion and consists primarily of oxides of silicon, aluminum, and iron.

The carbon component and the BTU per pound of the coal are found to be linearly dependent. In the HANDBOOK OF CHEMISTRY AND PHYSICS, 35th Edition, by Chemical Rubber Publishing Co., Cleveland, Ohio, on pages 1758 and 1759, there is listed in table format the BTU per pound content versus percent carbon in coal samples taken from numerous locations. A least square straight line fit to this data indicates that the following relationship exists for a correlation coefficient of 0.986;

$$\text{BTU/lb} \times 10^{-3} = 17.815(\text{wt. fraction of carbon}) + 0.0046 \quad (1)$$

Consequently, the BTU content of a coal-bearing zone can be directly determined from a measure of the carbon content of the coal-bearing zone.

SUMMARY OF THE INVENTION

In accordance with the present invention, a coal-bearing formation traversed by a borehole is irradiated with a first group of neutrons of sufficient energy to produce gamma rays from inelastic neutron scattering in the carbon component of the coal in the formation. The formation is further irradiated with a second group of neutrons of insufficient energy to produce a significant quantity of gamma rays from inelastic neutron scattering in the carbon component of the coal in the formation. Thermal neutron capture gamma rays are produced by the ash, hydrogen, and sulfur in the coal by neutrons from both the first and second group of neutrons. In addition, 4.43-Mev energy gamma rays are produced by inelastic scattering of neutrons from the first source in the carbon component of coal. Gamma rays produced by both the first and second group of neutrons are measured separately, and a comparison of these separate gamma-ray measurements provides an indication of the carbon content of the coal in the formation. More particularly, the differential between those portions of such separate gamma-ray measurements that exceed the energy level of capture gamma rays produced by the hydrogen component of the coal is determined as being indicative of such carbon content.

In another aspect, that portion of the gamma-ray measurement produced in response to the second group of neutrons that lies within the energy band in which the sulfur component of the coal produces the most intense capture gamma rays is determined as being indicative of the sulfur content of the coal.

In a further aspect, a differential is determined between that portion of the gamma-ray measurement produced in response to the second group of neutrons that exceeds the energy level of the gamma rays produced by the hydrogen component and that portion of the gamma-ray measurement produced in response to the second group of neutrons that lies within the energy band of the most intense gamma rays produced by the sulfur component. This differential is representative of the ash content of the coal.

In a still further aspect, the neutrons returning to the borehole in response to irradiation of the coal-bearing formation with neutrons are measured as an indication of the hydrogen content of the coal.

For a more complete understanding of these features of the present invention, reference may now be made to the following detailed description of the preferred embodiment of a borehole logging system for carrying out such invention.

BRIEF DESCRIPTION OF THE DRAWING

FIG. 1 illustrates a borehole logging system for carrying out the present invention.

DESCRIPTION OF THE PREFERRED EMBODIMENT

Coal consists primarily of carbon (C), hydrogen (H), sulfur (S), and ash. The present invention is directed toward a method and system by which quantitative information about these major components of coal can be measured in situ.

Referring now to FIG. 1, there is illustrated a borehole logging tool and recording system for carrying out the logging operation of the present invention when the logging tool is located opposite a coal-bearing zone. The logging tool 10 includes neutron sources 11 and 12, gamma-ray detectors 13 and 14, and neutron detector 15. Neutron source 11 is preferably an americium-beryllium ($Am^{241}$-Be) source. The average energy of neutrons from this source is about 4.5 Mev. Neutrons with energy greater than about 4.43 Mev will produce 4.43-Mev gamma rays by way of inelastic scattering in the carbon of the coal-bearing zone. The detector 13 is preferably an NaI scintillation detector which measures these 4.43-Mev gamma rays from carbon as well as capture gamma rays from the remaining major coal components of hydrogen, sulfur, and ash.

Neutron source 12, on the other hand, is preferably a californium ($Cf^{252}$) source. The average energy of neutrons from this source is about 2.348 Mev. Most of the neutron output of this source is of insufficient energy to produce 4.43-Mev gamma rays by way of inelastic scattering in carbon. The detector 14 is preferably an NaI scintillation detector which measures gamma rays as does detector 13. However, since neutron source 12 is of insufficient energy to produce a significant quantity of 4.43-Mev gamma rays from carbon, the output of detector 14 is a measure primarily of the hydrogen, sulfur, and ash content of coal.

The spacing between the neutron source 11 and gamma-ray detector 13 is selected to yield maximum response by the gamma-ray detector 13 to the 4.43-Mev gamma rays produced by the carbon content of coal. The spacing between the neutron source 12 and gamma-ray detector 14 is selected such that the response of the gamma-ray detector 14 to gamma rays in noncoal-bearing zones is always proportional to the gamma-ray response of detector 13 in noncoal-bearing zones.

Also included in the logging tool 10 is a neutron detector 15, preferably an He³ proportional counter, to provide a measure of the total neutron moderating power of the coal-bearing zone. Hydrogen and carbon are both good neutron moderating materials and the carbon and nonmoisture-related hydrogen in coal correlate strongly with the energy content of the coal. Therefore, the neutron moderating power should also correlate strongly with the energy content and therefore provide a supplemental measure of the energy content of coal. The He³ counter can be operated with or without a cadmium shield to provide a thermal neutron measure or preferably with a cadmium shield to provide an epithermal neutron measure.

The output signals of the detectors 13–15 are amplified and coupled to conductors 16–18, respectively, included in the cable 19. At the surface, these signals from conductors 16–18 are applied by way of the slip rings 20 and brushes 21 to conductors 22–24. The signals on conductors 22–24 are amplified and processed by the units 25–34 of the recording system to provide on lines 35–38 four output signals representative of the carbon, ash, sulfur, and neutron moderating power, respectively, of the coal-bearing zone being logged.

The carbon signal is provided in response to the signals on conductors 22 and 23 from the gamma-ray detectors 13 and 14, respectively. As discussed above, the signal from detector 13 is a measure of the 4.43-Mev gamma rays from inelastic neutron scattering in carbon as well as capture gamma rays from the hydrogen, sulfur, and ash components of the coal-bearing zone. On the other hand, the signal from detector 14 is a measure of only the hydrogen, sulfur, and ash components since the output of neutron source 12 is of insufficient energy to produce 4.43-Mev gamma rays from carbon. Therefore, the difference between these two signals is a measure of the carbon content of the coal-bearing zone. This difference is determined by operation of the discriminators 25 and 27, the count rate meters 26 and 28, and the comparator 31. Both the discriminators are biased at slightly above 2.23 Mev so as to pass the amplified signals above this energy level from the detectors 13 and 14 to the count rate meters 26 and 28. This removes the 2.23-Mev energy level hydrogen component from the counting rates. The counting rates from these count rate meters 26 and 28 are then applied to the comparator 31 which is preferably an operational amplifier biased to produce the carbon signal in response to the counting rate differential.

The sulfur and ash signals are provided in response to only the signal on conductor 23 from the gamma-ray detector 14. In addition to being applied to discriminator 27 and count rate meter 28 as described above, the amplified signal from conductor 23 is also applied to the single-channel analyzer 29 and count rate meter 30. Single-channel analyzer 29 is biased to pass to the count rate meter 30 only those amplified signals from detector 14 that are in an energy band from about 4 Mev to 5.5 Mev. It is in this energy band that the most intense 5.43-Mev gamma rays from sulfur are produced. Consequently, the signal on line 37 is a measure predominantly of the sulfur component of the coal-bearing zone. The counting rates from the count rate meters 28 and 30 are then applied to the comparator 32 which is preferably an operational amplifier biased to produce the ash signal in response to the counting rate differential.

The signal representing the neutron moderating power is provided in response to the signal on conductor 24 from the neutron detector 15 which responds only to neutrons. The amplified signal on conductor 24 is applied to the discriminator 33 which is biased to reject electronic noise. These signals are applied from discriminator 33 to the count rate meter 34. The counting rate from count rate meter 34 is therefore a measure of the neutron moderating power content of the coal-bearing zone.

An indication of hydrogen may also be made by measuring capture gamma rays in an energy interval from about 1.95 Mev to about 2.40 Mev. This may be done by applying the signal from either gamma-ray detector 13 or 14 to a single-channel analyzer and count rate meter. As shown in FIG. 1, the signal on conductor 22 from gamma-ray detector 13 is applied to single-channel analyzer 39 and count rate meter 40 to provide the hydrogen signal on line 41.

Various modifications to the disclosed embodiment, as well as alternate embodiments, may become apparent to one skilled in the art without departing from the scope and spirit of the invention as hereinafter defined by the appended claims.

I claim:

1. A system for logging a coal-bearing formation traversed by a borehole, comprising:
   a. a borehole tool,
   b. means for locating said borehole tool adjacent a coal-bearing formation,
   c. a first neutron source located within said borehole tool for irradiating the coal-bearing formation with neutrons of energy sufficient to produce 4.43-Mev gamma rays from inelastic neutron scattering in the carbon component of the coal-bearing formation,
   d. a first detector located within said borehole tool for measuring the gamma rays returning to the borehole in response to irradiation of the coal-bearing formation by neutrons from said first neutron source,
   e. a second neutron source located within said borehole tool at a spaced-apart position from said first neutron source for irradiating the coal-bearing formation with neutrons of energy insufficient to produce a significant number of 4.43-Mev gamma rays from inelastic neutron scattering in the carbon component of the coal-bearing formation,
   f. a second detector located within said borehole tool for measuring the gamma rays returning to the borehole in response to irradiation of the coal-bearing formation by neutrons from said second neutron source,
   g. means for producing a first count of those gamma rays measured by said first detector that are of an energy level above the energy level of the gamma rays produced by the hydrogen component of the coal-bearing zone,
   h. means for producing a second count of those gamma rays measured by said second detector that are of an energy level above the energy level of the gamma rays produced by the hydrogen component of the coal-bearing zone, and
   i. means for determining the differential between said first and second counts as an indication of the carbon content of the coal-bearing formation.

2. The system of claim 1 wherein the spacing between said second neutron source and said second detector is selected such that the response of said second detector to gamma rays in a noncoal-bearing zone is proportional to the response of said first detector to gamma rays in a noncoal-bearing zone.

3. The system of claim 1 further including means for identifying that portion of the gamma rays measured by said second detector that lies in an energy band in which most intense gamma rays from the sulfur are produced, said portion being an indication of the sulfur content of the coal-bearing formation.

4. The system of claim 3 further including means for determining the differential between the gamma rays measured by said second detector and that portion of said gamma rays measured by said second detector within said energy band, said differential being an indication of the ash content of the coal-bearing formation.

5. The system of claim 3 wherein said energy band extends from about 4 million electron volts to about 5.5 million electron volts.

6. The system of claim 1 wherein said first and second counts are a measure of those gamma rays detected by said first and second detectors above about 2.23 million electron volts.

7. The system of claim 1 further including:
  a. a neutron detector located within said borehole for measuring the neutrons returning to the borehole in response to irradiation of the coal-bearing formation, and
  b. means for identifying that portion of the neutrons measured by said neutron detector that is indicative of the neutron moderating power of the coal-bearing formation.

8. The system of claim 1 further including means for identifying that portion of the gamma rays measured by said first detector that lies in an energy band which extends from about 1.95 million electron volts to about 2.40 million electron volts, said portion being an indication of the hydrogen content of the coal-bearing formation.

9. The system of claim 1 further including means for identifying that portion of the gamma rays measured by said second detector that lies in an energy band which extends from about 1.95 million electron volts to about 2.40 million electron volts, said portion being an indication of the hydrogen content of the coal-bearing formation.

10. A method of logging a coal-bearing formation traversed by a borehole, comprising the steps of:
  a. irradiating the coal-bearing formation with a first group of neutrons of sufficient energy to produce 4.43-Mev gamma rays from inelastic neutron scattering in the carbon component of the coal and producing a first signal representative of the total number of gamma rays returning to the borehole from the coal-bearing formation,
  b. irradiating the coal-bearing formation with a second group of neutrons of insufficient energy to produce 4.43-Mev gamma rays from inelastic neutron scattering in the carbon component of the coal and producing a second signal representative of the total number of gamma rays returning to the borehole from the coal-bearing formation,
  c. identifying those portions of the gamma rays represented by said first and second signals that lie above the energy level of gamma rays produced by the hydrogen component of the coal, and
  d. determining the differential between said portions of said first and second signals.

11. The method of claim 10 further including the steps of:
  a. identifying a first portion of the gamma rays represented by said second signal that lies within an energy band in which the sulfur component of the coal produces the most intense gamma rays, and
  b. producing a fourth signal representative of said first portion of said second signal as an indication of the sulfur content of the coal.

12. The method of claim 11 further including the steps of:
  a. identifying a second portion of the gamma rays represented by said second signal that lies above the energy level of gamma rays produced by the hydrogen component of the coal, and
  b. determining the differential between said first and second portions of said second signal to produce a fifth signal representative of the ash content of the coal.

13. The method of claim 10 further including the steps of:
  a. producing a signal representative of the neutrons returning to the borehole from the coal-bearing formation,
  b. identifying that portion of said signal that is indicative of the neutron moderating power of the coal, and
  c. producing a signal representative of said portion of said signal as an indication of the neutron moderating power of the coal.

14. The method of claim 10 further including the step of identifying that portion of the gamma rays represented by said first signal that lies in an energy band from about 1.95 million electron volts to about 2.40 million electron volts as an indication of the hydrogen content of the coal.

15. The method of claim 10 further including the step of identifying that portion of the gamma rays represented by said second signal that lies in an energy band from about 1.95 million electron volts to about 2.40 million electron volts as an indication of the hydrogen content of the coal.

* * * * *